(12) United States Patent
Johnson et al.

(10) Patent No.: US 11,175,663 B1
(45) Date of Patent: Nov. 16, 2021

(54) AUTOMATED MARINE NAVIGATION

(71) Applicant: Sea Machines Robotics, Inc., Boston, MA (US)

(72) Inventors: Michael Gordon Johnson, Boston, MA (US); Lauren Anne Lamm, Boston, MA (US)

(73) Assignee: Sea Machines Robotics, Inc., Boston, MA (US)

( * ) Notice: Subject to any disclaimer, the term of this patent is extended or adjusted under 35 U.S.C. 154(b) by 0 days.

(21) Appl. No.: 17/201,429

(22) Filed: Mar. 15, 2021

(51) Int. Cl.
| | |
|---|---|
| *G05D 1/00* | (2006.01) |
| *B63B 79/40* | (2020.01) |
| *B63B 79/10* | (2020.01) |
| *G05D 1/02* | (2020.01) |

(52) U.S. Cl.
CPC ........... *G05D 1/0088* (2013.01); *B63B 79/10* (2020.01); *B63B 79/40* (2020.01); *G05D 1/0206* (2013.01)

(58) Field of Classification Search
CPC .... G05D 1/0088; G05D 1/0206; B63B 79/40; B63B 79/10
USPC .......................................................... 701/21
See application file for complete search history.

(56) References Cited

U.S. PATENT DOCUMENTS

| | | |
|---|---|---|
| 6,308,649 B1 | 10/2001 | Gedeon |
| 8,215,252 B1 | 7/2012 | Chun |
| 8,494,697 B2 | 7/2013 | Ballou et al. |
| 8,989,948 B2 | 3/2015 | Huntsberger et al. |
| 9,145,191 B2* | 9/2015 | Lofgren ................. B63B 39/00 |
| 9,816,812 B2 | 11/2017 | Huntsberger et al. |
| 10,002,471 B2 | 6/2018 | Blayvas et al. |
| 10,259,544 B2 | 4/2019 | Venables et al. |
| 2009/0222154 A1* | 9/2009 | Lopriore ............. G05D 1/0206 701/21 |
| 2011/0153125 A1* | 6/2011 | Arbuckle ............... B63H 21/22 701/21 |
| 2014/0114509 A1* | 4/2014 | Venables ................. B63B 79/20 701/21 |
| 2017/0097639 A1 | 4/2017 | Edwards et al. |
| 2017/0300056 A1* | 10/2017 | Johnson ............... G05D 1/0206 |
| 2019/0339700 A1 | 11/2019 | Berg et al. |

FOREIGN PATENT DOCUMENTS

WO 2016109601 A1 7/2016

OTHER PUBLICATIONS

Wenzhe Xu, "A Machine Learning Framework to Model Extreme Events for Nonlinear Marine Dynamics," Naval Architecture and Marine Engineering, University of Michigan, 196 pages, (2020).
Stelzer, Roland and Karim Jafarmadar, "A Layered System Architecture to Control an Autonomous Sailbooat," Towards Autonomous Robotic Systems (TAROS 2007), pp. 153-159 (2007).

(Continued)

*Primary Examiner* — Peter D Nolan
*Assistant Examiner* — Luke Huynh
(74) *Attorney, Agent, or Firm* — Bass Patent Law, LLC

(57) ABSTRACT

Autonomously piloting a sea-faring vessel traveling on a pre-defined course at a nominal speed includes: measuring a slamming parameter of the vessel; determining that the slamming parameter is outside an acceptable range; and autonomously decreasing the speed of the vessel until the slamming parameter is within the acceptable range, thereby causing the vessel to enter a reduced-speed mode.

5 Claims, 7 Drawing Sheets

(56) References Cited

OTHER PUBLICATIONS

Z. Liu, "Ship Adaptive Course Keeping Control With Nonlinear Disturbance Observer," in IEEE Access, vol. 5, pp. 17567-17575, (2017).

Jakovlev et al., "Research on Ship Autonomous Steering Control for Short-Sea Shipping Problems," Transport, vol. 32(2): 198-208 (2017).

Guo et al., "An Autonomous Path Planning Model for Unmanned Ships Based on Deep Reinforcement Learning," Sensors, 20, 426, 35 pages (2020).

Felski, Andrzej and Karolina Zwolak, "The Ocean-Going Autonomous Ship—Challenges and Threats," Journal of Marine Science and Engineering, vol. 8, No. 41: 35 16 pages, (2020).

Chen et al., "Q-Learning-based Parameters Adaptive Algorithm for Active Disturbance Rejection Control and its Application to Ship Course Control," Neurocomputing, vol. 408, pp. 51-63 (2020).

Schlaefer, Alexander and Ole Blaurock, "Robotic Sailing," Proceedings of the 4th International Robotic Sailing Conference, 216 pages (2011).

\* cited by examiner

AUTOMATED MARINE NAVIGATION

BACKGROUND OF THE INVENTION

Techniques for autonomous navigation of sea-faring vessels is known in the art. However, many such techniques do not account for the comfort or safety of passengers or equipment, thereby limiting adoption of automated sea-faring vessels.

SUMMARY OF THE INVENTION

In general, in one aspect, autonomously piloting a sea-faring vessel traveling on a pre-defined course at a nominal speed includes: measuring a slamming parameter of the vessel; determining that the slamming parameter is outside an acceptable range; and autonomously decreasing the speed of the vessel until the slamming parameter is within the acceptable range, thereby causing the vessel to enter a reduced-speed mode.

Implementations may have one or more of the following features: The slamming parameter includes a time rate of change of the vessel's heave. The slamming parameter includes a pitch angle of the vessel. The slamming parameter includes a slamming force experienced by the vessel. Also includes exiting reduced-speed navigation mode after the expiration of a pre-determined time interval, wherein exiting reduced-speed mode includes increasing the vessel's speed until either (a) the slamming parameter falls within the acceptable range, or (b) the vessel returns to its nominal speed.

In general, in another aspect, autonomously piloting a sea-faring vessel traveling on a pre-defined course includes: measuring a roll parameter; determining that the roll parameter is outside an acceptable range; and autonomously determining an updated course that includes one or more tacking legs, in which each tacking leg makes a corresponding tacking angle with respect to the nominal course, thereby entering the vessel in a tacking mode.

Implementations may have one or more of the following features: Each tacking angle of each tacking leg is determined by incrementing an intermediate tacking angle of the vessel until either (a) a maximum tacking angle is reached, or (b) the roll parameter is within the acceptable range. The updated course includes at least one turning maneuver. The turning maneuver is initiated immediately following a peak in a wave's contact force on the vessel. The wave contacting the vessel is detected by the occurrence of a local extremum in a pitch angle of the vessel. The roll parameter includes a roll angle of the vessel. The roll parameter includes a time rate of change of a roll angle of the vessel.

These and other aspects may be expressed in methods, systems, sea-faring vessels, or other forms. Other features and advantages of the invention are apparent from the following description, and from the claims.

DETAILED DESCRIPTION

Overview

Figure 1:
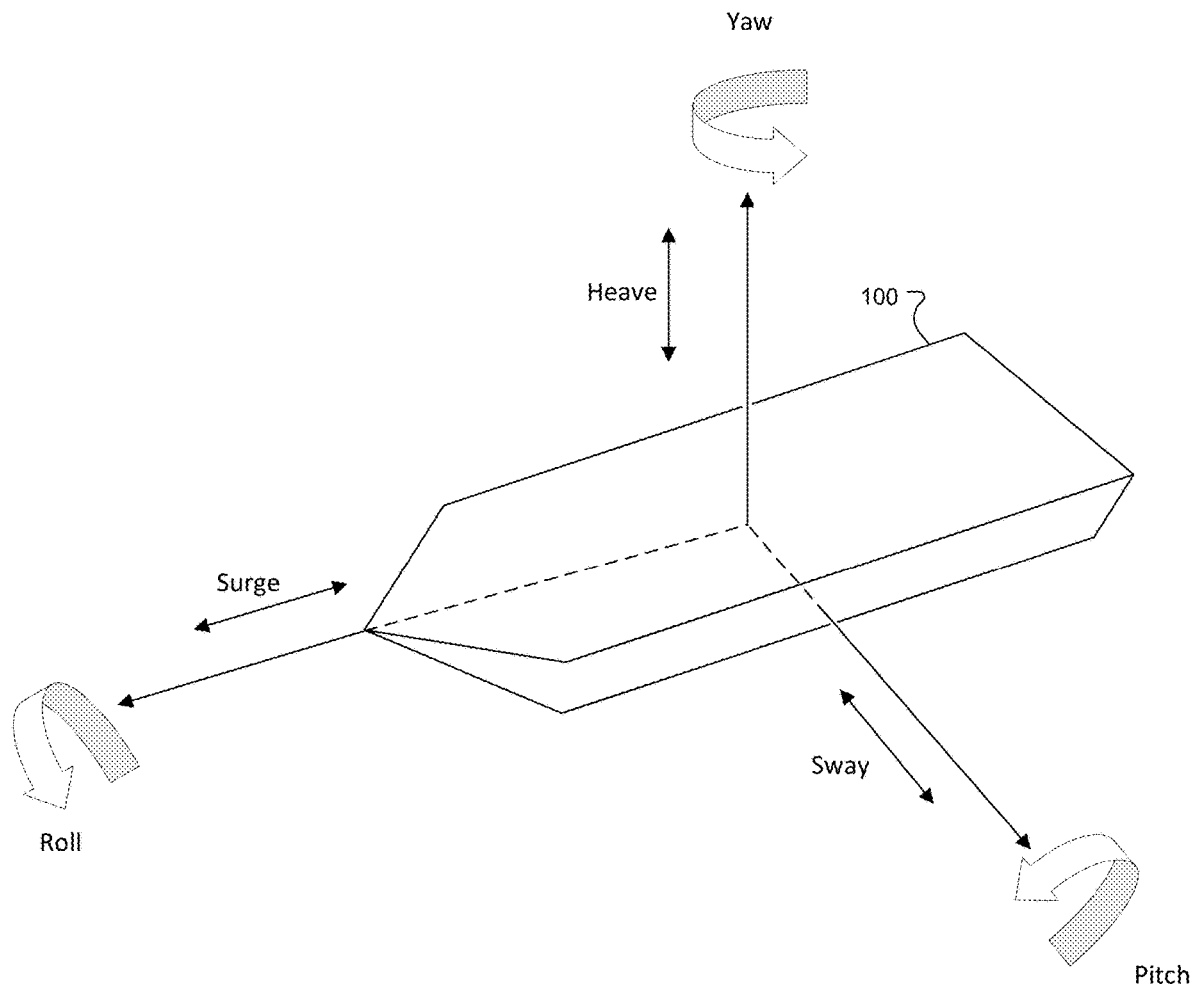
FIG. 1 is a perspective view of a coordinate system.

A sea-faring vessel 100 can experience motion with respect to three axes, as shown in FIG. 1. Rotational motion along the respective axes shown in FIG. 1 is called yaw, pitch, and roll. Translational motion in these axes is called, respectively, heave, sway, and surge.

Although extreme translational or rotational motion along any axis can be uncomfortable for any onboard passengers, certain extreme motions can be particularly dangerous. For example, extreme heave or extreme pitch can result in dangerously increased stress on load-bearing structures in the vessel 100, can result in damage to onboard equipment or injury to onboard personnel, or can result in the vessel foundering, taking on excess water, or other undesirable consequences. Extreme heave and/or pitch is also known as "slamming."

Extreme rolling motion can also be particularly dangerous: it presents a risk to cargo or reactionary forces to the vessel caused by cargo motions, for movement of unsecured or inadequately secured equipment, a risk of on-board personnel falling, and in extreme cases can result in the vessel taking on excess water, becoming swamped, or capsizing.

Figure 2:
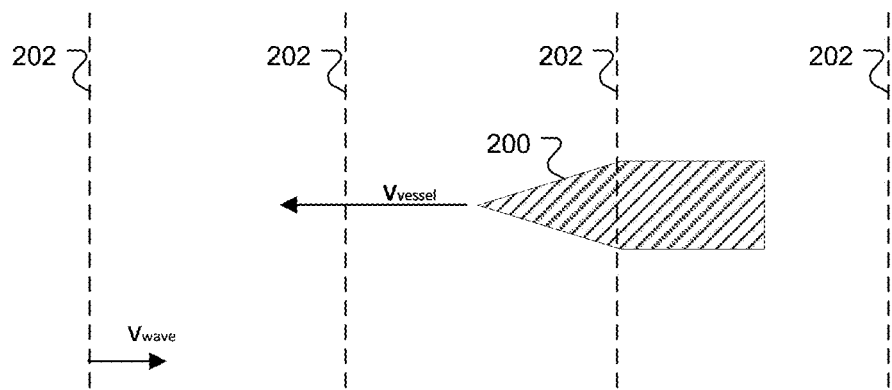
FIG. 2 is an overhead view of a vessel undergoing slamming.
Figure 3:
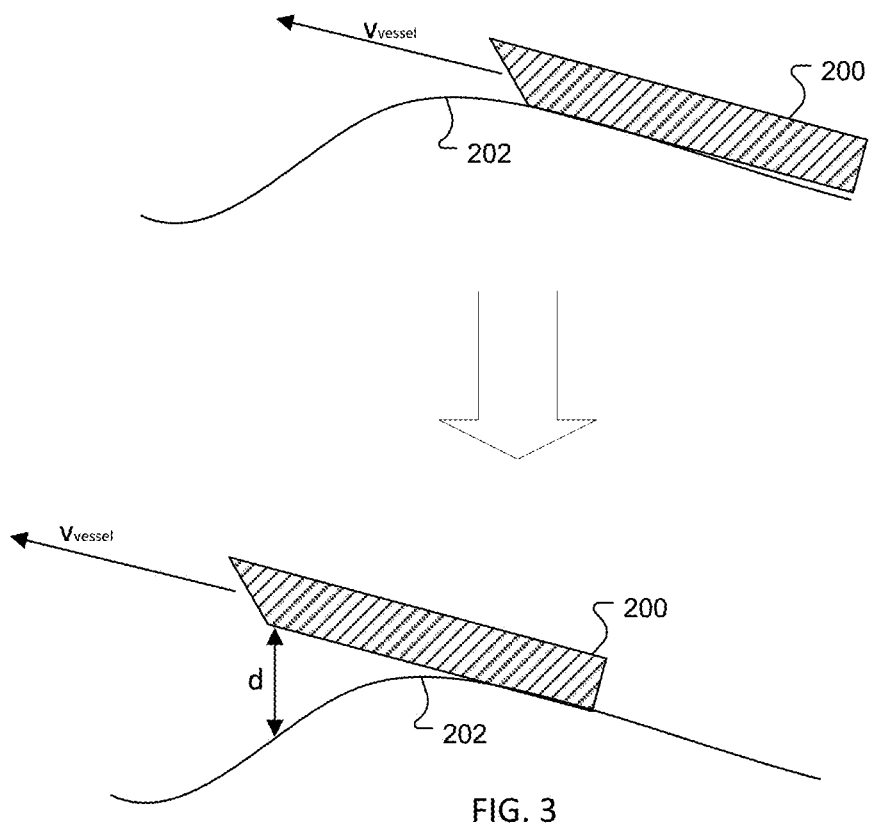
FIG. 3 is a side view of a vessel undergoing slamming.

FIG. 2 is an overhead view of a vessel undergoing slamming, and FIG. 3 is the corresponding side view. In FIG. 2, a vessel 200 is traveling with a velocity $v_{vessel}$ (with respect to any fixed reference frame; e.g., with respect to the ground which is assumed for the purposes of illustration to be at rest), and is traveling through a series of waves having wavefronts 202 traveling with velocity $v_{wave}$ relative to the ground.

Referring to FIG. 3, as a wavefront 202 and the vessel 200 pass each other, the vessel pitches upwards to meet the wave surface. Then the vessel's velocity carries it over the wave's crest, such that a gap of distance d emerges between the bottom surface of the vessel 200 and the top of the water. In turn, the vessel 200 experiences an extreme change in pitch angle and/or heave, followed by an extreme deceleration or an abrupt stop to this motion as the vessel re-establishes contact with the surface of the water.

The maximum distance d experienced by a vessel as it traverses a wave is one way to measure the magnitude of the slamming that the vessel 200 is experiencing. Moreover, this maximal d is correlated with the difference in velocity $|v_{vessel} - v_{wave}|$. In particular, reducing this velocity difference is operable to reduce the maximal distance d, and consequently to mitigate the adverse effects of slamming.

Figure 4:
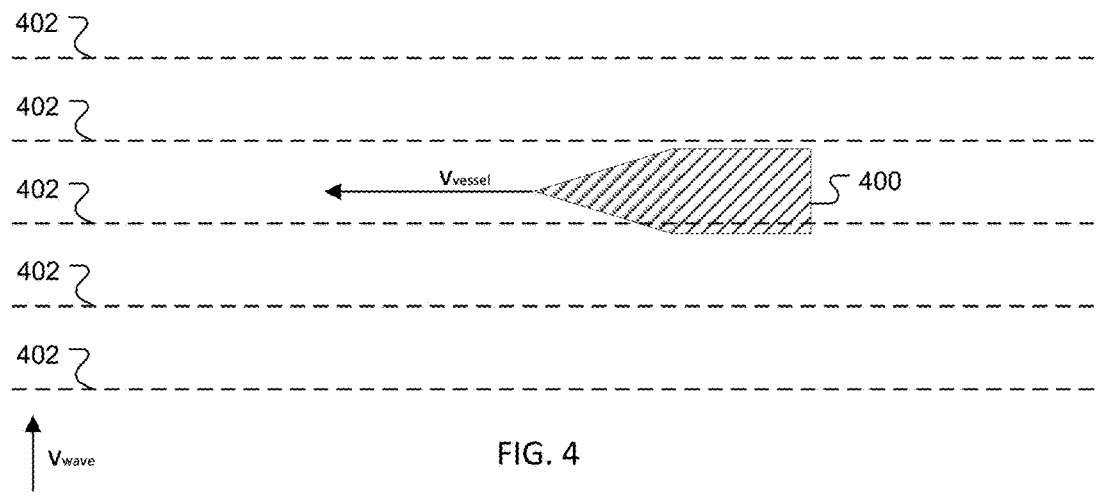
FIG. 4 is an overhead view of a vessel undergoing rolling.
Figure 5:
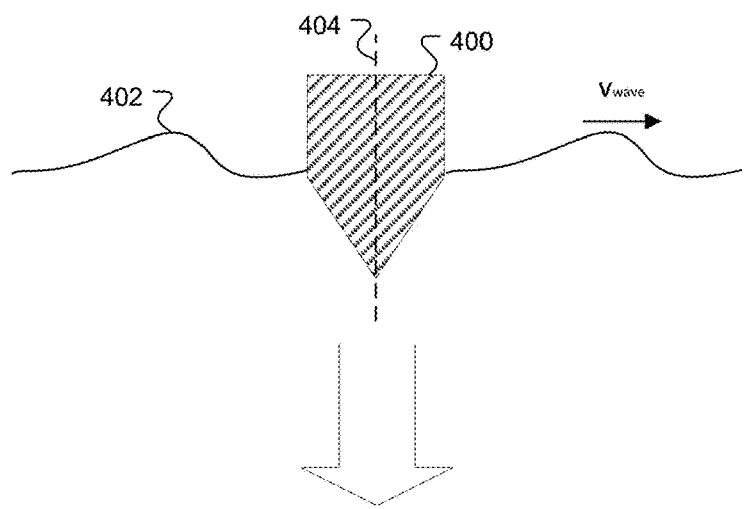
FIG. 5 is a side view of a vessel undergoing rolling.
Figure 5:
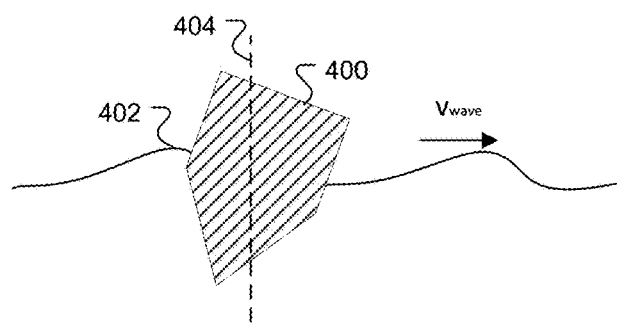

FIG. 4 is an overhead view of a vessel undergoing rolling, and FIG. 5 is the corresponding side view. In this case, a vessel 400 is traveling with velocity $v_{vessel}$, and a series of wavefronts 402 are approaching with velocity $v_{wave}$ perpendicular to the vessel. As shown in FIG. 5, the wavefront 402 impacts the vessel 400 and imparts a rolling motion, causing the vessel to deviate from its stable upright position (as indicated by the dashed line 404).

The degree to which an incoming wave imparts a rolling motion to the vessel depends in part on the angle the wave makes with the vessel. Thus, one way to mitigate the roll induced by the wavefront 402 is by altering (i.e., decreasing) the angle that the vessel 400 makes to the wavefront or wave direction.

The techniques described below implement these general observations in the context of autonomous or semiautonomous sea-faring vessels. Among other things, employing the techniques described below, a sea-faring vessel can mitigate the adverse effects of extreme slamming and/or rolling without human intervention and/or initiation of these techniques.

Implementations

Figure 6:
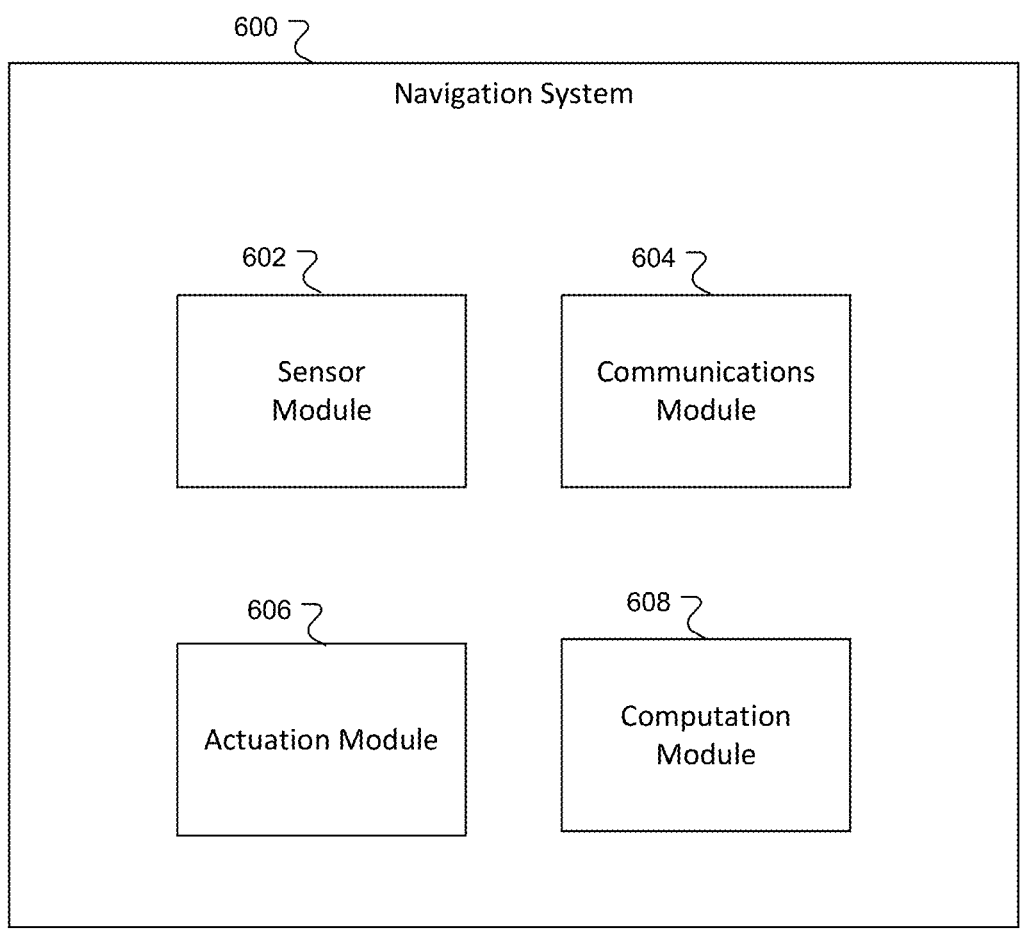
FIG. 6 is a block diagram of a navigation system.

FIG. 6 is a block diagram of an autonomous navigation system. As explained more fully below, the navigation system 600 can be implemented as software, hardware, or a combination of hardware and software. In some implementations, the navigation system 600 is implemented as a standalone computing device (with accompanying software) that may be deployed on "general purpose" sea-faring vessels; that is, vessels that were not specifically designed to accommodate autonomous navigation functionality.

The navigation system 600 includes a sensor module 602. The sensor module is operable to interface with various sensors either onboard a vessel or remote from a vessel. In some implementations, the sensors may include accelerometers and/or gyroscopes that measure the motion of the vessel, a component thereof, or an object therein (including but not limited to cargo). In some implementations, the sensors may include one or more cameras that are configured to acquire still images or video; e.g., images or video of incoming waves or the waters surrounding the vessel. In some implementations, the sensors can include one or more active or passive radio sensing systems, operable to sense the position(s) and/or motion(s) of other nearby vessels or other objects of interest. In some implementations, the sensors could include global positioning satellite ("GPS") receivers, operable to sense the position of the vessel with respect to the Earth. (This may be useful, e.g., to utilize external characterizations of the waters surrounding the vessel.) In some implementations, the sensors may include one or more marine Automatic Identification System ("AIS") receivers, operable to identify AIS signals sent by nearby vessels. In some implementations, the sensors may include radar sensors. In some implementations, the sensors include instruments for measuring weather conditions (e.g., one or more anemometers for measuring wind speed; one or more barometers for measuring atmospheric pressure, one or more thermometers for measuring temperature, etc.) In some implementations, the sensors include volumetric sensors operable to determine the amount of fluid in one or more points of a fluid reservoir. Other sensors are possible.

The navigation system 600 includes a communications module 604. The communications module is operable to facilitate communication between the navigation system 600 and external sources, command station, or destinations. In some implementations, the communications module 604 includes equipment suitable for electronic communications with other equipment, either onboard the vessel or remote from the vessel.

In some implementations, the communications module 604 includes one or more antennas suitable for cellular or data communication with other nearby vessels, with points on land, or with orbiting satellites. In some implementations, the communications module 604 includes hardware and/or software resources sufficient to implement data communication, including 3G-, 4G-, WiMax-, or 5G-enabled communication equipment, among other possibilities. In some implementations, the communications module 604 is operable to retrieve weather data for one or more points along the vessel's route, in addition to or instead of any weather-related onboard sensors in the sensor module 602.

The navigation system 600 includes an actuation module 606. The actuation module 606 is operable to effect changes to the vessel's course, speed, or other parameters. This includes implementing changes to the vessel's course and/or speed based on conditions described herein to mitigate slamming and/or rolling. In some implementations, the actuation module 606 can include middleware such as MOOS-IvP, maintained by the Massachusetts Institute of Technology as part of the Laboratory for Autonomous Marine Sensing Systems; Robotic Operating System ("ROS"), maintained by Willow Garage, Inc.; and/or Control Architecture for Robotic Agent Command and Sensing ("CARACaS"), maintained by the NASA Jet Propulsion Laboratory.

The navigation system 600 includes a computation module 608. The computation module 608 is operable to take as inputs any of the various measured quantities (e.g., inputs provided by the sensor module 602 and/or external data sources via the communications module 604), and perform computations on those inputs. Such computations include, e.g., the computations and/or comparisons described herein, including but not limited to those described in connection with FIGS. 7 and 8.

Other implementations of the navigation system 600 are possible. For example, other implementations are described in U.S. Pat. No. 10,467,908, entitled "Autonomous Boat Design for Tandem Towing," the entirety of which is incorporated by reference herein.

Figure 7:
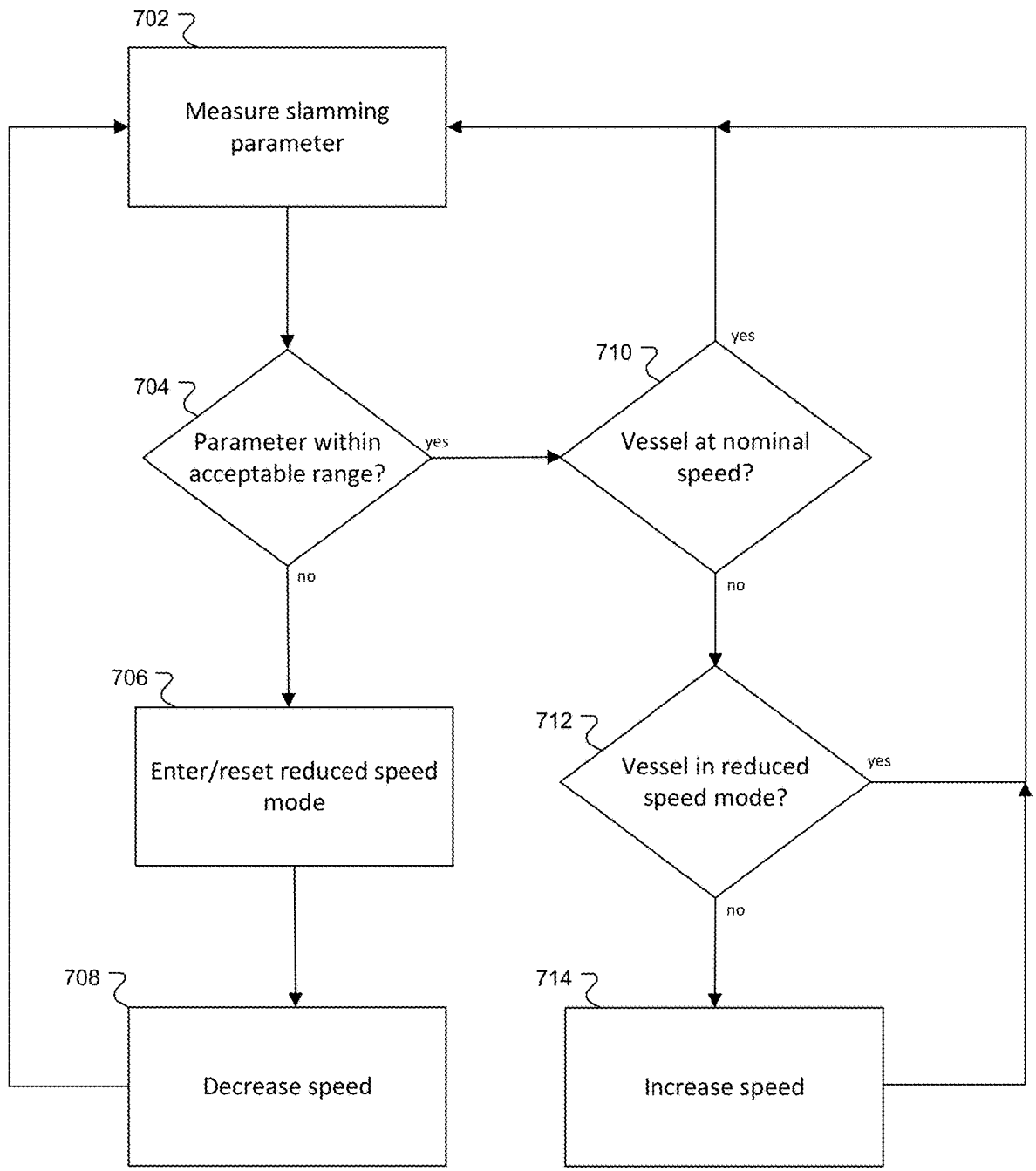
FIG. 7 is a flowchart of a process for mitigating slamming.

FIG. 7 is a flowchart for a technique to mitigate slamming experienced by a sea-faring vessel traveling at some nominal speed. The term "nominal speed" refers to the desired speed for the vessel in ideal conditions. This speed may be pre-determined or dynamically determined, either manually or via automated means.

In step 702, a slamming parameter is measured. The slamming parameter is a numerical measure of the degree to which the vessel is currently experiencing a slamming type of motion. In some implementations, the slamming parameter can include the vessel's pitch angle, or any time rate of change thereof. (Referring to FIG. 3, the rationale for the pitch angle or its rate(s) of change as a slamming parameter is that the greater the distance d is, the greater variation the vessel's pitch angle and/or its time rate(s) of change will be as it traverses the wave 202. On the other hand, the degree to which the vessel experiences a slamming-type motion also increases with d.)

Similarly, a slamming impact may be detected in other ways. For example, any force-sensing apparatus may directly measure the force with which the vessel's hull slams into the water below after traversing a wave. Alternatively, slamming the water may induce a strain across one or more components of the vessel (e.g., its hull, one or more beams or portions thereof, or any component mechanically coupled to both the bow and stern of the vessel). The induced strain, as detected by a strain gauge on the component, may also correlate with the degree of slamming. Thus, in some implementations, the slamming parameter may include: (1) the force with which a portion of the vessel (e.g., the vessel's bow) impacts the surface of the water; (2) the distance d of FIG. 3 (e.g., as measured by an optical measurement device); (3) the vessel's heave or any time rate of change thereof (4) the strain experienced by a component of the vessel.

Yet other possible slamming parameters may be determined not based on the motion experienced by the vessel, but rather the motion experienced by a component thereof or object therein (including but not limited to cargo). For example, one or more accelerometers, gyroscopes, or force sensing devices from the sensor module 602 may be coupled to an object onboard the vessel; e.g., relatively sensitive cargo. Yet another slamming parameter may be determined by transient fluctuations in the measured volume of fluid in a reservoir (e.g., fuel in a fuel tank). When undergoing slamming, the volume of fluid in the reservoir may slosh within the reservoir, which may be detected by volumetric sensors as a brief change in the actual volume, with more extreme slamming motion giving rise to more extreme sloshing, and therefore more extreme fluctuations in the measured fluid level. The magnitude of these changes may be used as a slamming parameter.

In decision 704, it is determined whether the measured slamming parameter is within an acceptable range. In general, the acceptable range of a slamming parameter depends on the particular vehicle and can be set manually by an operator or other personnel associated with the vehicle. In some alternative implementations, decision 704 may involve a collection of measurements of different slamming parameters instead of a single measurement. That is, decision 704 may determine whether a statistical quantity derived from a collection of measurements (e.g. mean, median, maximum or minimum value) falls outside the acceptable range, whether at least some threshold number of measurements from a collection of measurements falls outside the acceptable range, etc.

If the slamming parameter is not in the acceptable range, then the vessel enters reduced speed mode (step 706), and the time at which this occurs is noted. If the vessel was already in reduced speed mode, then the time at which reduced speed mode was entered is updated to reflect the time of the most recent measurement of step 702.

Upon entering or resetting reduced speed mode, the vessel's speed is decreased (step 708). In some implementations, the vessel's speed is decreased by a fixed amount, e.g. 5 knots. In some implementations, the vessel's speed is decreased to a fixed speed, e.g. 5 knots. In some implementations, the vessel's speed is decreased by a proportion of its current speed (e.g., 25%). In some implementations, the vessel's speed will not be decreased below a certain minimum speed. In some implementations, the minimum speed is 5 knots.

After decreasing the vessel's speed, the slamming parameter is measured again (step 702). In some implementations, the slamming parameter is sampled 100 times per second. In some cases, the loop comprising steps 702-704-706-708-702 continues until the slamming parameter enters an acceptable range (decision 704).

If it is determined in decision 710 that the vessel is not traveling at its nominal speed (i.e., its speed was recently decreased in at least one traversal of the loop 702-704-706-708-702), then it is next determined whether the vessel is in reduced speed mode (decision 712).

In some implementations, reduced speed mode may persist for a pre-determined amount of time; e.g., 1 minute from the first out-of-range parameter measurement, 1 minute from the most recent out-of-range parameter measurement, or some other time period. In some implementations, reduced speed mode may persist only for as long as the slamming parameter is measured to be out of the acceptable range.

If the vessel is in reduced speed mode (decision 712), then the process reverts back to re-sampling the slamming parameter without increasing the speed. On the other hand, if the vessel has exited reduced speed mode in decision 712, then the vessel's speed is increased (step 714). In some implementations the vessel's speed is increased a fixed amount (e.g. 5 knots) from its current speed. In some implementations, the vessel's speed is increased to a proportion of the vessel's nominal speed (e.g. 50%). In some implementations, the vessel's speed is increased by a proportion (e.g., 50%) of the amount of the most recent speed reduction from step 708. In some implementations, the vessel's speed is increased by a proportion (e.g., 50%) of the total amount of speed reduction from the repeated iterations of loop 702-704-706-708-702. In some implementations, the vessel's speed is increased to its nominal speed. The amount of speed increase may depend on the number of iterations of loop 702 704 710 712 714 702.

Figure 8:
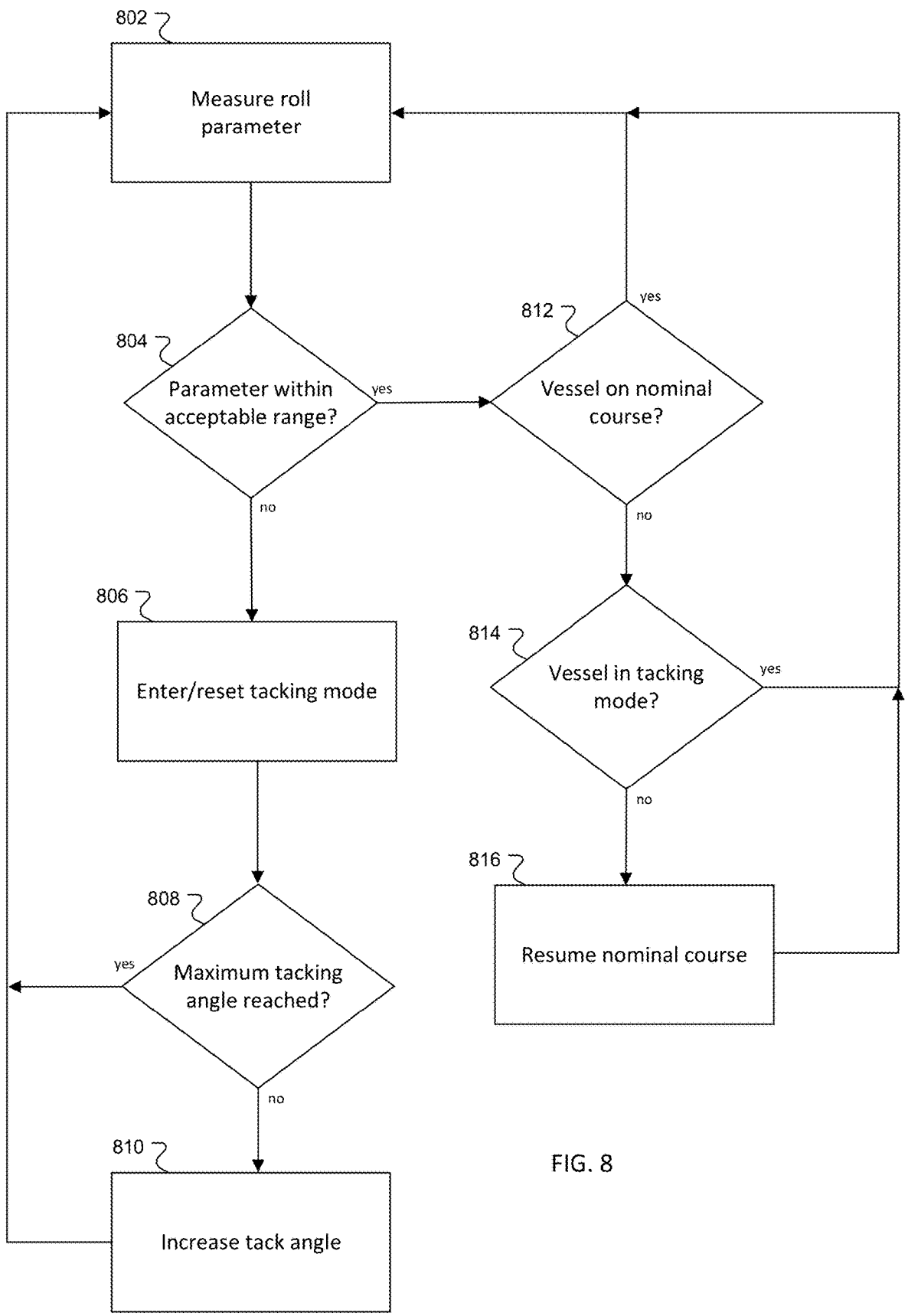
FIG. 8 is a flowchart of a process for mitigating rolling.

FIG. 8 is a flowchart for a technique to mitigate rolling experienced by a sea-faring vessel traveling on some nominal course. The term "nominal course" refers to the desired course for the vessel in ideal conditions. In some implementations, the nominal course is determined manually, in advance of the vessel's departure. In some implementations, the nominal course is determined dynamically, either manually or by automatic means.

In step 802, a roll parameter is measured. In some implementations, the roll parameter is vessel's roll angle or time rate(s) of change thereof. In some implementations, the roll parameter is the roll angle or time rate(s) of change of an object (e.g., cargo) onboard the vessel. In some implementations, the roll parameter is the magnitude of a change in the volume level of a fluid induced by sloshing, as described above.

In decision 804, it is determined whether the roll parameter is within an acceptable limit. In some alternative implementations, decision 804 may involve a collection of measurements instead of a single measurement. That is, decision 804 may determine whether a statistical quantity derived from a collection of measurements of the roll parameter (e.g. mean, median, maximum, or minimum value of the collection) falls outside the acceptable range, whether at least some threshold number of measurements from a collection of measurements falls outside the acceptable range, etc. If the roll parameter is within an acceptable range and the vessel is on its nominal course (decision 812), then the vessel continues on its course while the roll parameter continues to be measured. In some implementations, the roll parameter is measured 100 times per second, and a sample window of 30 seconds is used. In some implementations in which the roll parameter is the roll angle, the acceptable range can be set by the user. In some implementations the acceptable range is less than or equal to 20 degrees.

If the roll parameter is found to be outside the acceptable range in decision 804, then the vessel enters tacking mode (step 806), with an initial tacking angle of 0 degrees. If a maximum tacking angle has not yet been reached (decision 808), then the vessel's course is adjusted by a pre-determined angle from the nominal course (step 810). In some implementations, the maximum permitted tacking angle is 45 degrees. In some implementations, the tacking angle is increased by a fixed number of degrees in step 810, e.g. 15 degrees either to port or starboard. In some implementations, the direction of the turn is such that the vessel turns into the wave, rather than away from the wave.

As discussed above with respect to FIG. 5, changing the tacking angle generally is effective to reduce the rolling parameter, thereby bringing it closer to the acceptable range. Thus, after possibly several iterations of loop 802-804-806-808-810, either the vessel adjusts its course so that the rolling parameter is in an acceptable range, or the maximum tacking angle has been achieved.

Figure 9:
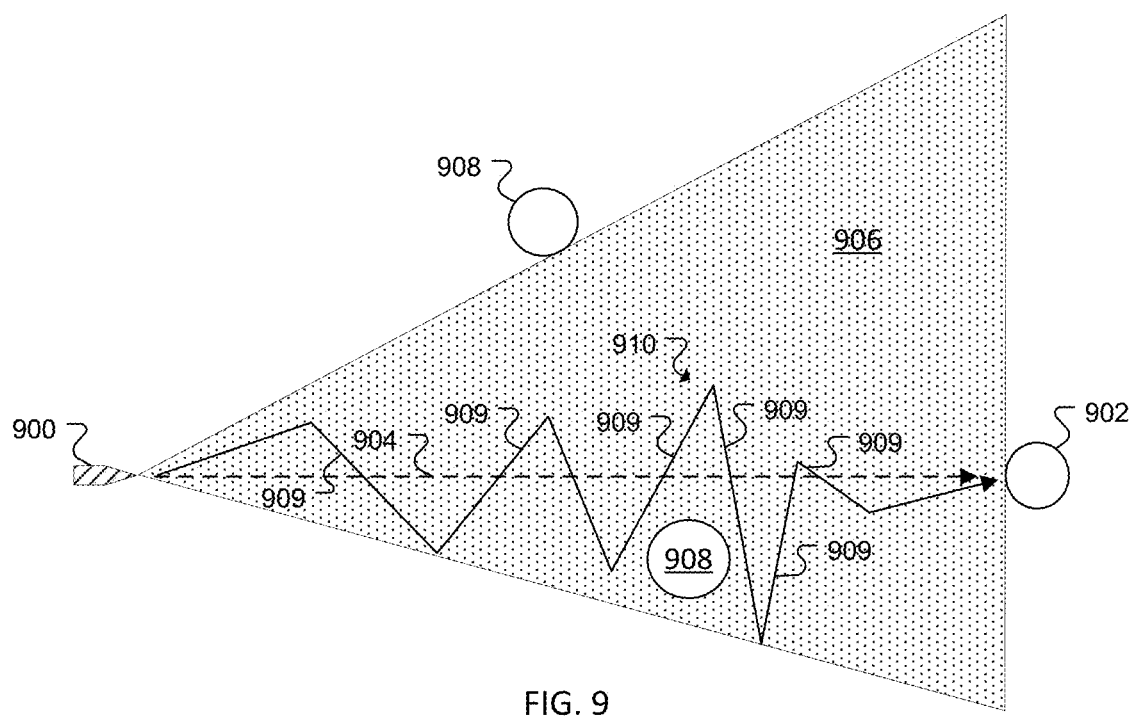
FIG. 9 is an overhead view of a roll-mitigated course.

Once either of these conditions occurs, the vessel proceeds on the updated course. Referring to FIG. 9, in some implementations, there may be further constraints on the vessel's updated course unrelated to roll mitigation. FIG. 9 is an overhead view of a vessel. The vessel 900 is initially traveling towards a destination 902 on a nominal course 904. At some moment, the vessel 900 encounters rough conditions, causing it to identify an updated course 910. In some implementations, the updated course 910 is a piecewise-linear course comprised of several linear tacking legs 909. A further constraint to the updated course is that, in some implementations, the vessel's updated course 910 must lie within a permitted navigation area 906. The permitted navigation area 906 may be identified based on external sources (e.g., maps or other navigation charts), or may be determined by real-time sensor data (e.g., depth sensors operable to identify areas of insufficient depth for the vessel; cameras or other optical sensors operable to identify other vessels or obstructions 908, etc.). In some implementations, there may be a constraint on the maximum permitted length of a tacking leg, e.g. one half of a nautical mile. If the vessel has reached the maximum permitted tacking length, then it may begin a new tacking leg by turning 90 degrees towards the nominal course 904 and resuming its journey. In some implementations, the maximum permitted length of a tacking leg is a function of the tacking angle. In particular, in some implementations, the tacking legs are of sufficient length that the midpoints of each tacking leg coincides with the vessel's nominal course. While turning, there is the potential that the vessel is particularly vulnerable to oncoming waves; i.e., if the vessel 900 is oriented with respect to the wave as shown in FIG. 4. Thus, in some implementations, the 90 degree turn is timed to begin directly after a wave's peak force is exerted on the vessel 900. This peak force condition may be inferred from sensor data. In some implementations, the wave timing may be inferred from optical sources. In some implementations, the wave timing may be inferred from the vessel's motion. For example, when the pitch angle of the vessel encounters a local extremum (i.e., begins to decrease after previously increasing, or begins to increase after previously decreasing), then the peak wave contact force may be inferred and turning maneuver may be executed. In some implementations, an additional amount of thrust (e.g., 15%) may be applied to help execute the turn.

Referring back to FIG. 8, after potentially several iterations of loop 802-804-806-808-810, the vessel may bring its roll parameter back into an acceptable range in decision 804. Although the vessel will not be on its nominal course (decision 812), if the vessel remains in tacking mode (decision 814) it will continue to execute travel along successive tacking legs and execute successive turning maneuvers to traverse its updated course while completing possibly several iterations of loop 802-804-812-814-802. After remaining in tacking mode for a time period, the vessel may test whether it is permissible to exit tacking mode. In some implementations, this time period may be dynamically determined. For example, if the vessel is currently in weather/sea conditions that are relatively stable, then the time period may be relatively long (e.g., 30 minutes). If the vessel is currently in weather/sea conditions that are likely to change rapidly, the time period may be relatively short (e.g., 5 minutes). In some implementations, such a test may be performed by resuming the heading of its nominal course and measuring the rolling parameter for another pre-determined time (e.g., 60 seconds). If the rolling parameter is within the acceptable range, the vessel exits tacking mode and resumes its nominal course (step 816). If not, the vessel re-enters tacking mode, executing subsequent loops of FIG. 8 as appropriate.

In some implementations, the condition to exit tacking mode (or test whether exiting tacking mode is permissible) may be determined by measurements, rather than the passage of a time interval. For example, updated weather data may indicate that the source of strong winds and/or waves has subsided. In some implementations, this (or other weather-related condition) may be used to determine whether it is permissible to exit tacking mode, as described above.

The systems, methods, components, or other approaches described above may be implemented in software, or in hardware, or a combination of hardware and software. The software may include instructions stored on a non-transitory machine-readable medium, and when executed on a general-purpose or a special-purpose processor implements some or all of the steps summarized above. The hardware may include Application-Specific Integrated Circuits (ASICs), Field Programmable Gate Arrays (FPGAs), and the like. The hardware may be represented in a design structure. For example, the design structure comprises a computer accessible non-transitory storage medium that includes a database representative of some or all of the components of a system embodying the steps summarized above. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, alternatively, the database may itself be the netlist (with or without the synthesis library) or the data set. A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method of autonomously piloting a sea-faring vessel traveling on a nominal course, the method comprising:
   measuring a roll parameter;
   determining that the roll parameter is outside an acceptable range;
   autonomously determining an updated course that includes one or more tacking legs, in which:
      each tacking leg makes a corresponding tacking angle with respect to the nominal course, thereby entering the vessel in a tacking mode; and
      each tacking angle of each tacking leg is determined by incrementing an intermediate tacking angle of the vessel until either (a) a maximum tacking angle is reached, or (b) the roll parameter is within the acceptable range; and
   autonomously piloting the vessel on the updated course.

2. A method of autonomously piloting a sea-faring vessel traveling on a nominal course, the method comprising:
   measuring a roll parameter;
   determining that the roll parameter is outside an acceptable range;
   autonomously determining an updated course that includes one or more tacking legs, in which each tacking leg makes a corresponding tacking angle with respect to the nominal course, thereby entering the vessel in a tacking mode,
      in which the updated course includes at least one turning maneuver,
      in which the turning maneuver is initiated immediately following a peak in a wave's contact force on the vessel; and
   autonomously piloting the vessel on the updated course.

3. A system comprising:
   a sensor module in data communication with one or more processors, the sensor module operable to measuring a roll parameter of a sea-faring vessel traveling on a nominal course;
   an actuation module in data communication with the one or more processors, the actuation module operable to effect a change in a course or a speed of the vessel;
   determining that the roll parameter is outside an acceptable range; and
   autonomously determining an updated course that includes one or more tacking legs, in which each tacking leg makes a corresponding tacking angle with respect to the nominal course, thereby entering the vessel in a tacking mode,
   in which each tacking angle of each tacking leg is determined by incrementing an intermediate tacking angle of the vessel until either (a) a maximum tacking angle is reached, or (b) the roll parameter is within the acceptable range.

4. A system comprising:
   a sensor module in data communication with one or more processors, the sensor module operable to measuring a roll parameter of a sea-faring vessel traveling on a nominal course;
   an actuation module in data communication with the one or more processors, the actuation module operable to effect a change in a course or a speed of the vessel;
   determining that the roll parameter is outside an acceptable range; and
   autonomously determining an updated course that includes one or more tacking legs, in which each tacking leg makes a corresponding tacking angle with respect to the nominal course, thereby entering the vessel in a tacking mode,
   in which the updated course includes at least one turning maneuver, in which the turning maneuver is initiated immediately following a peak in a wave's contact force on the vessel.

5. The system of claim 4, in which the wave contacting the vessel is detected by an occurrence of a local extremum in a pitch angle of the vessel.

* * * * *